US010454671B2

(12) United States Patent
Thorwirth et al.

(10) Patent No.: US 10,454,671 B2
(45) Date of Patent: Oct. 22, 2019

(54) SECURING COMMUNICATION IN A PLAYBACK DEVICE WITH A CONTROL MODULE USING A KEY CONTRIBUTION

(71) Applicant: Verimatrix, Inc., San Diego, CA (US)

(72) Inventors: Niels J. Thorwirth, San Diego, CA (US); Petr Peterka, San Diego, CA (US); Klaus Schenk, Unterföhring (DE); Ingo Barth, Unterföhring (DE)

(73) Assignee: Verimatrix, Inc., San Diego, CA (US)

( * ) Notice: Subject to any disclaimer, the term of this patent is extended or adjusted under 35 U.S.C. 154(b) by 93 days.

(21) Appl. No.: 15/516,360

(22) PCT Filed: Oct. 15, 2015

(86) PCT No.: PCT/US2015/055826
§ 371 (c)(1),
(2) Date: Mar. 31, 2017

(87) PCT Pub. No.: WO2016/061411
PCT Pub. Date: Apr. 21, 2016

(65) Prior Publication Data
US 2017/0302446 A1 Oct. 19, 2017

Related U.S. Application Data

(60) Provisional application No. 62/064,409, filed on Oct. 15, 2014.

(51) Int. Cl.
*H04L 29/06* (2006.01)
*H04L 9/08* (2006.01)
(Continued)

(52) U.S. Cl.
CPC .......... *H04L 9/0822* (2013.01); *H04L 9/0861* (2013.01); *H04L 9/0894* (2013.01);
(Continued)

(58) Field of Classification Search
CPC ... H04L 9/0861; H04L 9/0894; H04L 9/0822; H04L 2209/603; H04L 2209/608;
(Continued)

(56) References Cited

U.S. PATENT DOCUMENTS

2004/0073954 A1  4/2004  Bjordammen et al.
2004/0088558 A1  5/2004  Candelore
(Continued)

FOREIGN PATENT DOCUMENTS

WO    2016061411 A1    4/2016

OTHER PUBLICATIONS

International Preliminary Report on Patentability for International Application PCT/US2015/055826, Report issued Apr. 18, 2017, dated Apr. 27, 2017, 7 Pgs.
(Continued)

*Primary Examiner* — Amir Mehrmanesh
(74) *Attorney, Agent, or Firm* — KPPB LLP

(57) ABSTRACT

Systems and methods for securing communications in a playback device using a key base and at least one key contribution in accordance with embodiments of the invention are disclosed. In one embodiment, a process includes generating a key base using a decryption key and at least one key contribution, where the decryption key can be recovered using the key base and the at least one key contribution, receiving the key base, receiving the at least one key contribution, sending the key base to a decryption module, sending the key contribution to a control module, performing a control feature on the piece of content using the control module, providing the key contribution to the decryption module when the control feature is performed, generating the decryption key using the key base and the at least one key contribution, and accessing at least a portion of the piece of content.

17 Claims, 5 Drawing Sheets

(51) Int. Cl.

| | |
|---|---|
| *H04N 21/2347* | (2011.01) |
| *H04N 21/236* | (2011.01) |
| *H04N 21/254* | (2011.01) |
| *H04N 21/266* | (2011.01) |
| *H04N 21/4405* | (2011.01) |
| *H04N 21/4623* | (2011.01) |
| *H04N 21/4627* | (2011.01) |
| *H04N 21/8358* | (2011.01) |

(52) U.S. Cl.
CPC ... *H04N 21/2347* (2013.01); *H04N 21/23614* (2013.01); *H04N 21/2541* (2013.01); *H04N 21/26606* (2013.01); *H04N 21/26613* (2013.01); *H04N 21/4405* (2013.01); *H04N 21/4623* (2013.01); *H04N 21/4627* (2013.01); *H04N 21/8358* (2013.01); *H04L 2209/603* (2013.01); *H04L 2209/608* (2013.01)

(58) Field of Classification Search
CPC .......... H04N 21/4623; H04N 21/4405; H04N 21/26613; H04N 21/23614; H04N 21/8358; H04N 21/2347; H04N 21/4627; H04N 21/2541
See application file for complete search history.

(56) References Cited

U.S. PATENT DOCUMENTS

| | | | |
|---|---|---|---|
| 2004/0111631 A1* | 6/2004 | Kocher | G06Q 20/367 |
| | | | 713/194 |
| 2008/0046718 A1* | 2/2008 | Grab | G06F 21/10 |
| | | | 713/156 |
| 2011/0013773 A1 | 1/2011 | Pinder | |
| 2013/0004142 A1* | 1/2013 | Grab | H04N 5/913 |
| | | | 386/259 |
| 2013/0019107 A1* | 1/2013 | Grab | G06F 21/10 |
| | | | 713/189 |
| 2013/0159707 A1 | 6/2013 | Jogand et al. | |
| 2014/0123170 A1 | 5/2014 | Kummer | |
| 2014/0281489 A1 | 9/2014 | Peterka et al. | |
| 2016/0070890 A1* | 3/2016 | Grab | G06F 21/10 |
| | | | 713/164 |
| 2017/0099136 A1* | 4/2017 | Straub | H04L 9/0819 |

OTHER PUBLICATIONS

International Search Report and Written Opinion for International Application No. PCT/US2015/055826, Search completed Dec. 6, 2015, dated Jan. 6, 2016, 8 Pgs.

Extended European Search Report for European Application No. 15851418.2, Search completed Apr. 26, 2018, dated May 4, 2018, 8 Pgs.

* cited by examiner

US 10,454,671 B2

SECURING COMMUNICATION IN A PLAYBACK DEVICE WITH A CONTROL MODULE USING A KEY CONTRIBUTION

CROSS REFERENCE TO RELATED APPLICATIONS

This application is a national stage of PCT Patent Application No. PCT/US2015/055826, entitled "Securing Communication in a Playback Device with a Control Module Using a Key Contribution" to Thorwirth et al., filed Oct. 15, 2015, which claims priority to U.S. Provisional Patent Application No. 62/064,409, entitled "Securing Communication with a Control Module Using a Key Contribution" to Thorwirth et al., filed Oct. 15, 2014, the disclosures of which are incorporated herein by reference in their entirety.

FIELD OF THE INVENTION

The present invention relates generally to multimedia content playback and more specifically to ensuring the execution of a supplementary function by a control module in addition to playback.

BACKGROUND OF THE INVENTION

Conditional access (CA) and Digital Rights Management (DRM) systems for digital video transmissions are widely used to secure commercial television services. Such systems typically use encryption to secure media transmission to digital client devices, such as a set-top box, mobile device or PC. The CA or DRM system implements the controlled distribution of the decryption keys to authorized receivers only. The keys are typically required for content playback and the keys are often secured against unauthorized discovery by secrets embedded in and protected by the client device.

A conditional access (CA) system provides access to digital broadcast content for authorized individuals and can be implemented as discussed below.

A CA server typically includes head-end equipment that is connected to multiplexing and scrambling system of Transport Streams (TS) and is configured to manage the process of encryption TV program and data, injecting service information and customer management. A CA system typically includes the following components for content protection.

A conditional access (CA) server includes a Control Word Generator (CWG) that generates CWs (Control Words) that are used by the scrambler to scramble and thereby secure the content. Encryption is often used to protect the control word (CW) during transmission to the client receiver. The control word (CW) is typically encrypted and delivered via an Entitlement Control Message (ECM). Typically, only the authorized subscriber's equipment is permitted to decrypt the control word (CW). The entitlement or authority as well as the keys to decrypt the CW in the ECM is sent to the receiver in the form of an Entitlement Management Message (EMM).

A Multiplexer/Scrambler provides the scrambling of audio/video streams using a CW control word. The multiplexer (MUX) accepts Program Streams (PS), Entitlement Management Message (EMM), Entitlement Control Message (ECM) and Event Info Scheduler (EIS) information. The multiplexer (MUX) performs time multiplexing of input data and outputs an MPEG-2 transport stream.

The control word (CW) is typically sent to the receiver in encrypted form within an entitlement control message (ECM). The CW is valid for a particular crypto-period (CP), which is typically 10 seconds long. The ECMs are typically repeated (e.g., 10 times per second) so that the set-top boxes (STBs) are able to quickly start descrambling after changing channels.

Additionally, the CA or DRM system also often implements control and/or authentication mechanisms during playback that manage how the content may be processed, used, and secured. Examples are controls of allowed outputs (e.g., DHCP) and digital watermarking.

SUMMARY OF THE INVENTION

Systems and methods for securing communications in a playback device using a key base and at least one key contribution in accordance with embodiments of the invention are disclosed. In one embodiment, a process includes generating a key base using a decryption key and at least one key contribution using a rights management server, where the decryption key can be recovered using the key base and the at least one key contribution and the decryption key is necessary to access a piece of content, sending the key base and the at least one key contribution to a playback device using the rights management server, receiving the key base at a client application in the playback device, receiving the at least one key contribution at the client application in the playback device, sending the key base to a decryption module in the playback device, sending the key contribution to a control module in the playback device, performing a control feature on the piece of content using the control module in the playback device, providing the key contribution to the decryption module when the control feature is performed, generating the decryption key using the key base and the at least one key contribution using the decryption module in the playback device, and accessing at least a portion of the piece of content using at least the generated decryption key using the playback device.

In a further embodiment, the key contribution is required to derive the key base.

Another embodiment includes sending the at least one key contribution to the playback device using the rights management server includes encrypting the key contribution, and generating the decryption key using the key base and the at least one key contribution using the decryption module in the playback device includes decrypting the encrypted key contribution.

In a still further embodiment, the at least one key contribution is the same length as the decryption key.

In still another embodiment, generating a key base using a decryption key and at least one key contribution using a rights management server includes performing an exclusive-OR (XOR) over the decryption key and the at least one key contribution by computing $K \text{ XOR } KC = KB$, where $K$ is the decryption key, $KC$ is the key contribution, and $KB$ is the key base.

In a yet further embodiment, generating a key base using a decryption key and at least one key contribution using a rights management server includes performing an exclusive-OR (XOR) over the decryption key and the at least one key contribution by includes computing $K \text{ XOR } KC' = KB$, where $K$ is the decryption key, $KC'$ is the combined XOR of multiple key contributions, and $KB$ is the key base.

In yet another embodiment, sending the key base to a decryption module in the playback device includes encrypting the key base using the rights management server and the method also includes decrypting the encrypted key base in a key ladder using the decryption module in the playback device.

In a further embodiment again, generating the decryption key using the key base and the at least one key contribution using the decryption module in the playback device includes generating the decryption key using the key base and the at least one key contribution in a key ladder.

In another embodiment again, generating the decryption key using the key base and the at least one key contribution using the decryption module in the playback device includes performing an exclusive-OR (XOR) over the key base and the at least one key contribution.

In a further additional embodiment, performing an exclusive-OR (XOR) over the key base and the at least one key contribution computing KB XOR KC=K, where K is the decryption key, KC is the key contribution, and KB is the key base.

In another additional embodiment, the control module is a watermark controller module and the control feature is inserting a watermark into video content.

In a still yet further embodiment, the control feature regulates what format the content is permitted to be output by the playback device.

In still yet another embodiment, sending the key base and the at least one key contribution to a playback device using the rights management server includes sending the key base and the at least one key contribution within one or more entitlement control messages (ECM).

In a still further embodiment again, the key contribution is specific to the receiving playback device.

In still another embodiment again, the control module executes within a trusted environment.

In a still further additional embodiment, the trusted environment is a hardware security module.

In still another additional embodiment, receiving the key base at a client application in the playback device and sending the key base to a decryption module in the playback device are not performed within the trusted environment.

In a yet further embodiment again, a system for securing communications in a playback device using a key base and at least one key contribution includes a rights management server that includes a first processor, and memory including a key generation application, and a playback device including that includes a second processor, and memory including a client application, a control application, and a decryption application, where the rights management server is configured by the key generation application to generate a key base using a decryption key and at least one key contribution, where the decryption key can be recovered using the key base and the at least one key contribution, send the key base and the at least one key contribution to a playback device, and where the playback device is configured by the client application to receive the key base, receive the at least one key contribution, and send the key base to a decryption application within the playback device, and send the key contribution to a control application within the playback device, where the playback device is configured by the control application to perform a control feature on the piece of content, and provide the key contribution to the decryption module when the control feature is performed, and where the playback device is configured by the decryption application to generate the decryption key using the key base and the at least one key contribution, and access at least a portion of the piece of content using at least the generated decryption key.

DETAILED DISCLOSURE OF THE INVENTION

Figure 1:
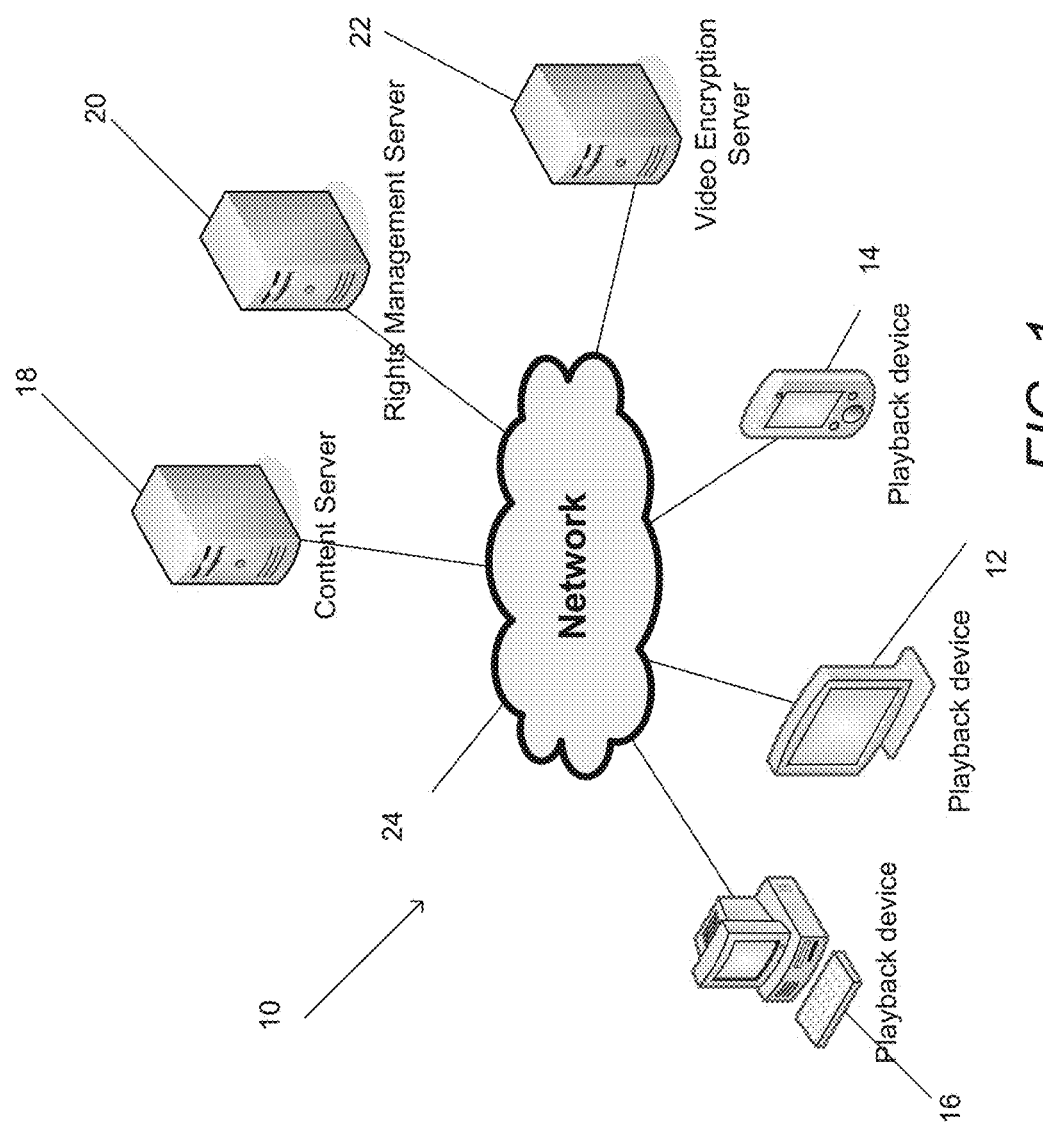
FIG. 1 is a system overview of a content playback system in accordance with embodiments of the invention.

Turning now to the drawings, systems and methods for securing communication in a playback device with a control module using a key contribution are disclosed. Playback of protected multimedia content on a playback device typically involves multiple processes or modules, some of which may execute independently. Playback may require an essential application or module to execute, while other applications or modules are intended to execute but can possibly be circumvented. For example, a piece of content is often encrypted in whole or in part such that playback requires a decryption application or module using decryption keys to access the encrypted portion(s). Meanwhile, a control module, such as a watermark controller module, may enforce some type of controls over the output format of the content but is not essential to achieving playback. Systems and methods in accordance with embodiments of the invention can take a key that is necessary to achieve playback and generate key components that are provided to applications or modules that are essential and non-essential to playback such that the non-essential applications or modules become essential to playback. Non-essential applications or modules bound in this way can be more resistant to circumvention. As will be discussed further below, key components can be referred to as a key base and key contribution.

In many embodiments of the invention, a control module on the playback device enforces control, authentication, and/or tracking mechanisms on the content being played back. Such capabilities can include, but are not limited to, watermarking the content and output control. Output control limits the output format including characteristics such as, but not limited to, security levels and connectors (such as High-bandwidth Digital Content Protection [HDCP]), and/or output quality (resolution, bitrate, etc.) or connector independent transmission formats like DLNA. In the case of a watermark controller, a perceptible or imperceptible watermark may be placed on the content. A watermark can be individualized to be indicative of some characteristics of the particular piece of content that supports authentication and/or tracking, such as, but not limited to, the original source, channel of distribution, playback device identification, content purchase transaction identification and/or original recipient.

Watermark controllers and other types of control modules may be susceptible to certain attacks that bypass, disable, fake, replay and/or intercept communications to or from the control module. The communication with these control modules and mechanisms can be secured against blocking and replay attacks by separating a decryption key used to access content into key components referred to as a key base and key contribution and routing the key components through the control modules as will be described below. At the head-end system, a rights management server that typically distributes decryption keys to playback devices can also separate a decryption key into key components. A rights management server manages and/or provisions access rights to digital assets by users. In various embodiments of the invention, a rights management server may be a conditional access (CA) server, digital rights management (DRM) server, or other server that enforces playback rights to video content by managing decryption keys. A key contribution can be chosen and combined with the decryption key to generate a key base. The key contribution and key base can be sent to the playback device where they are routed through separate modules such that all modules must be executed in order to achieve playback. In various embodiments, the key contribution(s) and/or key base is provided to a playback device in content protection signaling messages.

Content protection signaling can refer to messages and/or other types of communication utilized in managing rights to play back digital content and/or facilitating the playback of content in accordance with granted rights. Some of these types of signaling can include Entitlement Control Messages (ECM) used in Conditional Access (CA) systems and key delivery messages used in adaptive bitrate streaming systems utilizing digital rights management (DRM) schemes. Content protection signaling messages can include, for example, a playlist in HTTP Live Streaming (HLS) or a content manifest in Dynamic Adaptive Streaming over HTTP (MPEG-DASH), e.g., within a PSSH box. In several embodiments, a key contribution and/or key base is sent to the playback device within a content protection signaling message such as an Entitlement Control Message (ECM), a message carrying conditional access information in a digital broadcast conditional access system, or a key delivery message. The decryption key may be the control word (CW) that is typically otherwise contained in an ECM or the decryption key that is typically otherwise contained in a key delivery message. In additional embodiments, the decryption key is a key, such as a service key, that is used in a key ladder to access the key that is used to decrypt the content. In some embodiments, in the playback device an ECM is filtered out of a transport stream and its contents are sent to a secure computing environment. Systems and methods for utilizing a key base and one or more key contributions to secure communications within a playback device are described below.

System Architecture and Devices

A content playback system for securing communication with a control module using a key contribution in accordance with embodiments of the invention is illustrated in FIG. 1. The illustrated system 10 includes playback devices 12, 14, and 16, a content server 18, a rights management server 20, and a content encryption server 22 that communicate over a network 24. Examples include the Internet, an IPTV network, or a cable or satellite network. In various embodiments, content server 18, head end server 20, and content encryption server 22 may communicate over private networks. Playback devices 12, 14, and 16 can include personal computers, mobile phones, televisions, and/or other consumer devices such as set top boxes (STB) or tablets. Playback devices may request content from the content server 18. Content server 18 may obtain encoded content from encryption server 22.

Playback devices may receive content protection signaling messages and key delivery messages from rights management server 20 before or while playing back content. As will be discussed further below, content protection signaling messages and key delivery messages can contain key bases and key contributions (or instructions when and how to obtain them) that facilitate securing communications within playback devices.

Although a specific system architecture is described above with respect to FIG. 1, one skilled in the art would recognize that any of a variety of architectures may be utilized in accordance with embodiments of the invention, such as including more, fewer, or different components than those discussed above. For example, a network may or may not be used. In some embodiments, content signaling messages and/or key delivery messages are included on a disk (e.g., DVD or Blu-ray disk), drive, or other media rather than transmitted over a network.

Playback Devices

Figure 2:
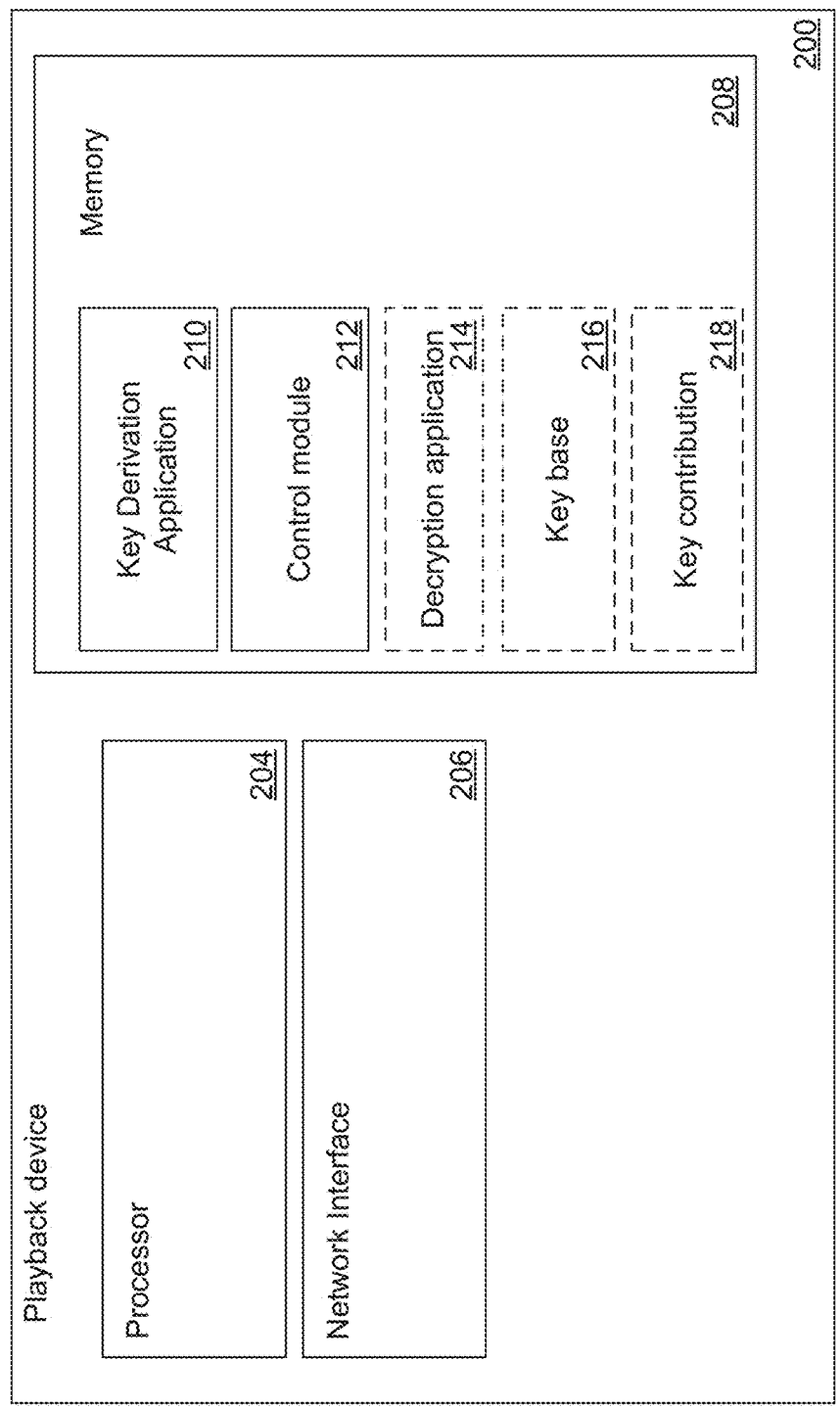
FIG. 2 conceptually illustrates a playback device in accordance with an embodiment of the invention.

FIG. 2 conceptually illustrates a playback device in accordance with embodiments of the invention. The playback device 200 includes a processor 202, network interface 204, and non-volatile memory 208. The non-volatile memory 208 includes a key derivation application 210, control module 212, and decryption application 214. The key derivation application, when executed, configures the processor 204 to perform certain functions or processes such as processes for generating a decryption key from a key base and one or more key contributions as will be discussed further below. Non-volatile memory 208 may also include a client application that receives a key base and one or more key contributions, a control application, and a decryption application. In additional embodiments, any of the applications may be implemented in hardware modules and/or within trusted environments.

Rights Management Server

Figure 3:
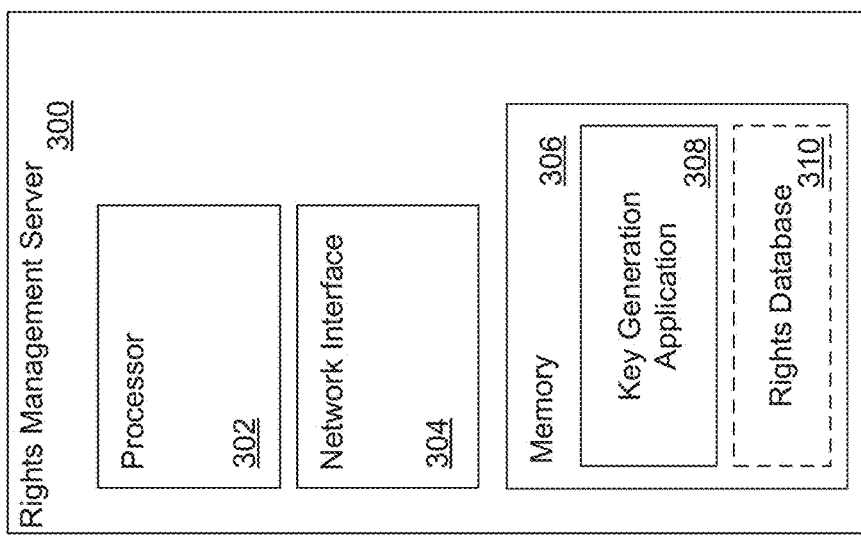
FIG. 3 conceptually illustrates a head end server in accordance with an embodiment of the invention.

FIG. 3 conceptually illustrates a rights management server in accordance with an embodiment of the invention. In many embodiments, a rights management server resides at a head end system. The rights management server 300 includes a processor 302, network interface 304, and non-volatile memory 306. The non-volatile memory 306 includes a key generation application 308 that, when executed, configures the processor 302 to perform certain functions or processes such as processes for generating key bases and key contributions as will be discussed further below. In some embodiments of the invention, rights management server 300 is also configured to generate a decryption key, from which a key base can be derived using one or more key contributions. In other embodiments, a video encryption server or other server at a head end system generates a decryption key and provides the decryption key to the rights management server.

The non-volatile memory 306 may also include a rights database for subscriber management 310 (or other appropriate data structure) that can store information concerning playback rights of various pieces of content that may be used in the generation of content protection signaling messages. Although a specific architecture for a rights management server is discussed above with respect to FIG. 3, one skilled in the art will recognize that any of a variety of architectures may be utilized to facilitate secure communications within a playback device in accordance with embodiments of the invention. For example, in other embodiments a separate server may execute a key generation application to generate a key base from a decryption key and key contribution(s).

Video Encryption Server

Figure 4:
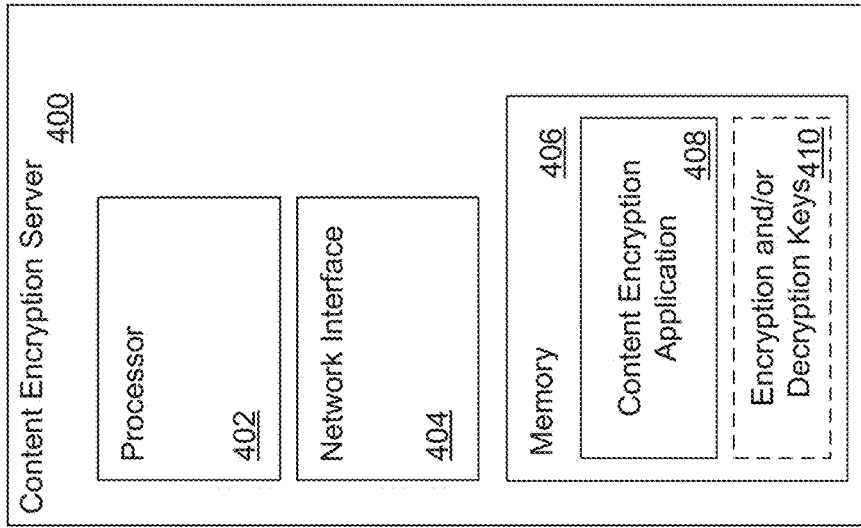
FIG. 4 conceptually illustrates a content encryption server in accordance with an embodiment of the invention.

FIG. 4 conceptually illustrates a content encryption server in accordance with an embodiment of the invention. The content encryption server 400 includes a processor 402, network interface 404, and non-volatile memory 406. The non-volatile memory 306 includes a content encryption application 308 that, when executed, configures the processor 302 to perform certain functions or processes for encrypting source content that can be decrypted using one or more decryption keys. The non-volatile memory 306 may also include one or more encryption and/or decryption keys 410 that can enable access to the encrypted content. Although a specific architecture for a content encryption server is discussed above with respect to FIG. 4, one skilled in the art will recognize that any of a variety of architectures may be utilized to facilitate secure communications within a playback device in accordance with embodiments of the invention. In different embodiments of the invention, a video encryption server resides at a head end system that includes a rights management server or resides at a different head end system. Alternatively, in other embodiments a single server may combine any of the configurations and capabilities of a rights management server and a video encryption server. For example, a video encryption server may generate a decryption key that is then communicated to a rights management server or other server that generates a key base.

Key Contribution and Key Base

As discussed further above, a decryption key may be required to access a particular piece of content. In some embodiments that utilize a conditional access (CA) system, the decryption key is referred to as a control word (CW). Other embodiments that implement a digital rights management (DRM) system may utilize a decryption key. In still further embodiments, the decryption key is a key (such as a service key issued to a particular device) that feeds into a key ladder that accesses the key that decrypts content. Additional embodiments may utilize any key that is necessary to achieve playback of content.

In many embodiments, a key component generation function is utilized to generate key components from a decryption key. The key components, when processed with a key derivation function, can be combined to recover the decryption key. In several embodiments of the invention, a key generation application on a rights management server executes a key component generation function and a key derivation application on a playback device executes a key derivation function.

In several embodiments, the key component generation function and the key derivation function are identical, i.e. symmetric. Suitable functions for symmetric key component generation and key derivation may be additive ciphers, where the sum of any N−1 members of a set results in the remaining member of the set. In some embodiments, the key component generation function and key derivation function are the exclusive OR (XOR) function. Other possible functions for transformations include using an algorithm like extended tiny encryption algorithm (XTEA), advanced encryption standard (AES), hash functions or step functions that allow additional settings of control ON/OFF with certain KW values. One skilled in the art will recognize that additional similar functions may be suitable in producing a key base and key contribution(s) such that a decryption key can be recovered from the key base and key contribution(s).

A key component generation function takes as inputs the decryption key and at least one key contribution (KC). As discussed further above, the decryption key typically provides access to the content. A key contribution is typically the same length as the decryption key. If shorter, it can be padded out to the same length or if longer it can be truncated. The key contribution(s) combined with the decryption key by the key component generation function produces a key base (KB). In some embodiments, a key contribution can be 0 or zeroes padded out to the length of the key base. In this case, the key base would be the same as the decryption key.

In some embodiments, the KC may change with every asset (content title) or every control word (K). This can discourage replay attacks that use the same KC messages at wrong times to disable or confuse the control module. In other embodiments, the KC may vary more frequently than K. In this case, the encrypter and the control module may be synchronized on when to change KC since the resulting decryption key will change more frequently than the transmitted key. This may introduce additional security of the decrypted stream that applies even if the key transmission mechanism should be compromised.

KC may also vary per client where different clients can receive different values for KB and KC. This enhances the security against sharing of values of either between different clients and is therefore not only effective to secure the control module but also to enable a client individual key transmission while maintaining a common encryption key between clients.

In addition to KC and KB, several KCs may be generated in either mode or mixed modes to enable parallel uses such as, e.g., securing communication with several control modules. As discussed in greater detail below, each control module may receive a KC that is then passed along to generate the decryption key.

Further embodiments of the invention support multiple key contributions. Where an additive cipher or XOR is used, multiple KC can be chosen to produce a key base (KB). The KB, when combined with the multiple KC using the additive cipher or XOR, then produces back the original decryption key K.

In additional embodiments, one or more parameters for the control module (e.g., watermarking parameters) are part of KC or used to derive it using, e.g., a hash function. In this case, the total amount of data transmitted to the client is smaller, since the parameters and KC are overlapping. To maintain variations in the key KC, some of it may still be chosen at random.

In still further embodiments, KC may also be derived from local information that is specific to a device, a component within a device, asset, or piece of content, such as static information in the device, dynamic information such as local time on a particular device (e.g. limiting the ability to derive KC to a time period), or information present in the content stream or video asset that is transformed using a transformation function known only on the client side in the control module. Static information can include, but is not limited to, a device identifier (ID), component identifier (e.g., chip identifier or serial number, hard disk identifier or serial number), or key within a security key ladder or trusted execution environment). Such additional measures can be useful in preventing KC from being cloned.

As will be discussed further below, KB and one or more KC can be provided to a playback device for use in securing communication within the playback device and generating a decryption key. In many embodiments, KB and KC are contained within content protection signaling messages or key delivery messages. In various embodiments, KB and KC are sent over a network or stored on a disk or other media.

Control Module

As discussed above, a control module can be a watermark controller. Other functionality that can be enabled in accordance with embodiments of the invention includes control functions in control modules that manage content flow and allowable actions that can be performed with the content on the client device. Ensuring that these parameters are delivered and processed in the right locations is an increasingly important part of securing digital media. Examples include the allowable output control, e.g., if the device is permitted to provide the output to an analogue output and/or if it needs to be secured with HDCP (High-bandwidth Digital Content Protection) and what HDCP version should be used. Other control parameters may be, e.g., the ability to transcode the content, the option to transmit it to other devices and what specifications or security levels those devices must comply to, if the content can be stored and how many digital copies are allowed, if any.

The control of these parameters may also be influence allowable resolution that the content can be presented in, depending on the security variations and ability to adhere to those, decreasing with lower security.

In many embodiments, KC must be provided to the decrypter by the control module, so that its execution cannot be circumvented by providing the information from a different location, using a different, unauthorized module. In many embodiments, the location of the control module can be a secure application processor, hardware security module, or Trusted Execution Environment such as ARM Trustzone. This mechanism enforces the control module to be in the execution path: if it is omitted by blocking its functionality, the decryption will fail. KC can be used to not only secure against blocking, but also to secure the communication of data to the control module against modification by using it to create a secure package that is combined with data by, e.g., encryption that prevents the modification of the data without resulting in modification of KC—which, in turn, would disable decryption. In several embodiments, renewal of the KC on a regular basis is used to prevent replay attacks that aim to circumvent security by playing previous messages to the control module. In this case, a secure package with an old KC will not lead to successful decryption. Processes for securing communications in a playback device using a key contribution are discussed below.

Figure 5:
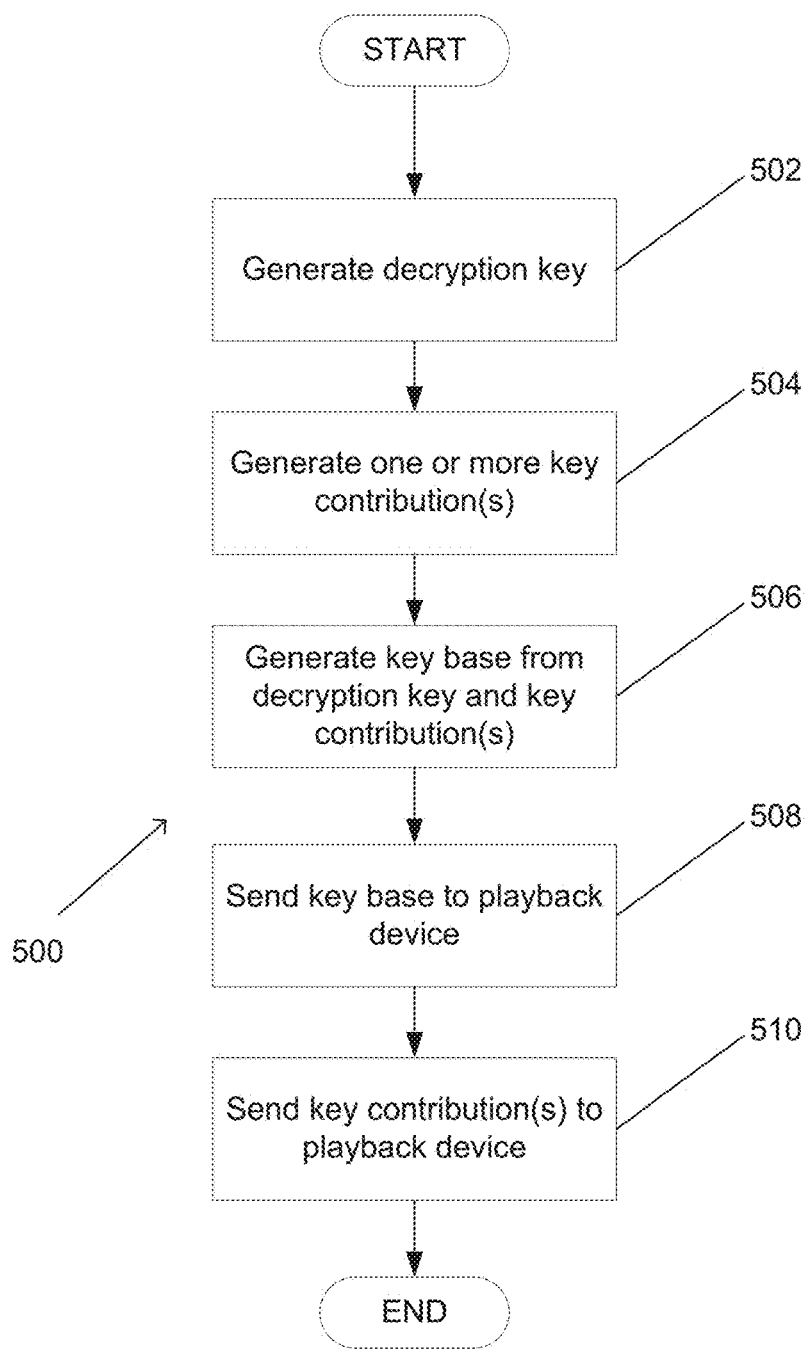
FIG. 5 illustrates a process for generating a key base and key contribution for securing communication within a playback device in accordance with embodiments of the invention.

Processes for Securing Communications in a Playback Device using a Key Contribution A process for preparing a key base and one or more key contributions using a rights management server to secure communication in a playback device in accordance with embodiments of the invention is illustrated in FIG. 5. In several embodiments, preparing a key base and one or more key contributions is performed before receiving a request from a playback device for access to play back content. In other embodiments, the process is performed after receiving a request from a playback device to access content.

The process includes receiving or generating (502) a decryption key. In many embodiments, the decryption key is associated with a piece of content and/or a user account that is permitted to access the content. In several embodiments, the decryption key allows access to other keys that facilitate access to the content. In some embodiments, the decryption key is a control word (CW) as used in conditional access (CA) systems for decrypting content. In further embodiments, the decryption key is a service key provisioned to a particular device that can be loaded into a key ladder on a playback device to decrypt key(s) used to access content or key(s) used to access content protection signaling messages such as ECMs. A decryption key may be generated by a rights management server or may be generated by another server in the head-end system and provided to the rights management server.

The process includes receiving or generating (504) one or more key contributions. Each key contribution may be generated by any of a variety of techniques, including, but not limited to, random number generation or human selection. A key base is generated (506) from the decryption key and one or more key contributions using a key component generation function as discussed further above (i.e., where the decryption key can be reconstructed using the one or more key contributions and the key base).

The key base is provided (508) to a playback device and the one or more key contributions are provided (510) to the playback device. In many embodiments, the key base and one or more of the key contributions are sent together in a single message to the playback device. In other embodiments, the key base and key contribution(s) are sent in separate messages. In several embodiments, the key base and key contributions(s) are sent within one or more content protection signaling messages. In further embodiments, the content protection signaling messages are entitlement control messages (ECM) provided to a conditional access (CA) client application or module on the playback device. In some embodiments, the key base and/or one or more key contributions may be encrypted such that they are accessible only by the intended process or module on the playback device for which they are destined. The key base and/or key contribution(s) may be secured against discovery such as using DRM and CA schemes to secure a control word or decryption keys. This security layer may be individual per client and bound to secrets available in a client device, accessible only by the hardware decoding process, and/or use device specific keys. In some embodiments, KC and control parameters may also be encrypted with a secret key known only in the head end and on the client side control module or using asymmetric encryption or digital signature to ensure better level of secrecy of the key in the control module.

In additional embodiments, the key base and/or one or more key contributions are stored on a disk or other media, which is provided to the playback device. The playback device can then read the key base and/or key contribution(s) from the disk or media.

Although a specific process for preparing a key base and one or more key contributions to secure communication in a playback device is described above with respect to FIG. 5, one skilled in the art will recognize that any of a variety of processes may be utilized in accordance with embodiments of the invention.

Figure 6:
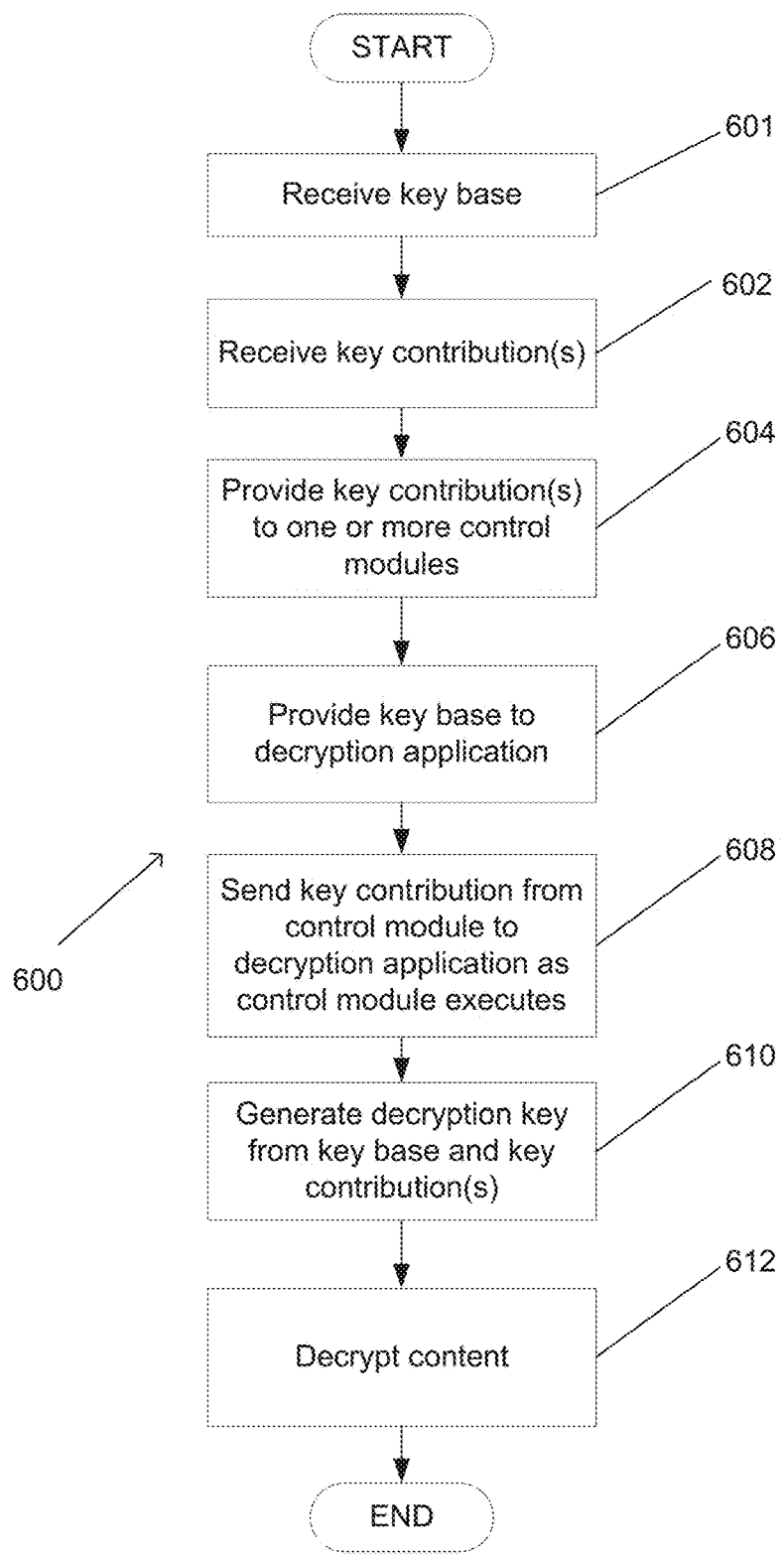
FIG. 6 illustrates a process for generating a decryption key from a key base and key contribution in accordance with embodiments of the invention.

A playback device may receive a key base and one or more key contributions and use them to derive the original decryption key associated with a piece of content or with other keys used to access the piece of content. With the decryption key, the playback device can proceed to decrypt and play back the piece of content. In several embodiments, the playback device is unable to play back the piece of content if it cannot reconstruct the decryption key. A process for generating a decryption key using a key base and one or more key contributions to secure communications in a playback device in accordance with embodiments of the invention is illustrated in FIG. 6.

The process includes receiving (601) a key base and receiving (602) one or more key contributions. In many embodiments, the key base and one or more key contributions are received by a conditional access (CA) client application or module on a playback device and distributed from the client application or module to other applications or modules, such as a decryption application or module and a control application or module. As discussed above, the key base and key contribution(s) in various embodiments may be received from a rights management server and/or may be contained in content protection signaling messages such as ECMs. In some embodiments, the key base and/or key contribution(s) are encrypted and are decrypted by the CA client application, decryption, or control application. Further embodiments implement a key ladder that utilizes additional keys. On the encryption side of a key ladder, each key is hierarchically encrypted under the next key in the stages of the key ladder until the last stage is reached that encrypts the key base and/or key contribution(s). At least one key in the key ladder may be a hardware protected root key. Each stage may be loaded with keys that are transported while encrypted under the key above in the key ladder hierarchy.

In additional embodiments, the key base and/or one or more key contributions are stored on a disk or other media, which is provided to the playback device. The playback device can then read the key base and/or key contribution(s) from the disk or media. In various embodiments, the key base and key contribution(s) may be sent or provided within the same message or mechanism or in separate messages or by different mechanisms as appropriate to a particular application.

The key contribution(s) are each provided (604) to a control module. As discussed above, control modules can include processes or hardware having authentication or tracking features to control aspects of the playback of a piece of content. In embodiments having multiple control modules, each control module can receive one or more key contributions. In several embodiments, each of the multiple control modules receives a different key contribution. In many embodiments, at least one control module is a watermark controller and places a perceptible or imperceptible watermark on the video content. In other embodiments, the control module determines what output formats are permitted for the video content, such as, but not limited to, resolution or video format (PAL, NTSC, VGA, HDMI, DVI, etc.).

The key base is provided (606) to a decryption application or module. The key contribution(s) are passed (608) from the control module(s) to the decryption application or module as the control module(s) executes. In several embodiments, the key contribution(s) are encrypted or otherwise placed in a scrambled form when received by the playback device and provided to the control module. The control module may decrypt or unscramble the key contribution(s) before provided it to the decryption application or module. Further embodiments implement a key ladder that utilizes additional keys. On the decryption side of a key ladder, each key is hierarchically decrypted under the next key in the stages of the key ladder until the last stage is reached that decrypts the key base and/or key contribution(s). At least one key in the key ladder may be a hardware protected root key. Each key may be decrypted to be used for decrypting the next lower stage of the key ladder.

The decryption key is generated (610) from the key base and key contribution(s). As discussed further above, the key base and key contributions are formulated such that the decryption key can be recovered from them using a key derivation function. In many embodiments, the key component generation function and the key derivation function are the same. The content is decrypted (612) for playback. In some embodiments, the content can be decrypted directly using the decryption key. In other embodiments, the decryption key is fed to a key ladder that results in decryption of the content. Although a specific process for recovering a decryption key and securing communications within a playback device is discussed above with respect to FIG. 6, one skilled in the art will recognize that any of a variety of processes may be utilized in accordance with embodiments of the invention. In other embodiments, a different application or module that is essential to playback may be utilized in place of the decryption application or module. For example, an application utilized to access content protection signaling messages (such as ECMs) may instead receive the key base and generate the decryption key from the key base and key contribution(s).

Although the description above contains many specificities, these should not be construed as limiting the scope of the invention but as merely providing illustrations of some of the presently preferred embodiments of the invention. Various other embodiments are possible within its scope. Accordingly, the scope of the invention should be determined not by the embodiments illustrated, but by the appended claims and their equivalents.

What is claimed is:

1. A method of securing communications in a playback device using a key base and at least one key contribution from a rights management server, the method comprising:
   generating a key base using a decryption key and at least one key contribution using a rights management server, where the decryption key can be recovered using the key base and the at least one key contribution and the decryption key is necessary to access a piece of content;
   sending the key base and the at least one key contribution to a playback device using the rights management server;
   receiving the key base at a client application in the playback device;
   receiving the at least one key contribution at the client application in the playback device;
   sending the key base to a decryption module in the playback device;
   sending the key contribution to a control module in the playback device;
   performing a control feature on aspects of playback of the piece of content to enforce control mechanisms on playback of the piece of content using the control module in the playback device when the control module has the key contribution;
   providing the key contribution from the control module to the decryption module when the control feature is performed by the control module;
   generating the decryption key using the key base and the at least one key contribution using the decryption module in the playback device; and
   accessing at least a portion of the piece of content using at least the generated decryption key using the playback device.

2. The method of claim 1, wherein sending the at least one key contribution to the playback device using the rights management server comprises encrypting the key contribution; and
   wherein generating the decryption key using the key base and the at least one key contribution using the decryption module in the playback device comprises decrypting the encrypted key contribution.

3. The method of claim 1, wherein the at least one key contribution is the same length as the decryption key.

4. The method of claim 1, wherein generating a key base using a decryption key and at least one key contribution using a rights management server comprises performing an exclusive-OR (XOR) over the decryption key and the at least one key contribution by computing K XOR KC=KB, where K is the decryption key, KC is the key contribution, and KB is the key base.

5. The method of claim 1, wherein generating a key base using a decryption key and at least one key contribution using a rights management server comprises performing an exclusive-OR (XOR) over the decryption key and the at least one key contribution by comprises computing K XOR KC'=KB, where K is the decryption key, KC' is the combined XOR of multiple key contributions, and KB is the key base.

6. The method of claim 1, wherein sending the key base to a decryption module in the playback device comprises encrypting the key base using the rights management server and the method further comprises decrypting the encrypted key base in a key ladder using the decryption module in the playback device.

7. The method of claim 1, wherein generating the decryption key using the key base and the at least one key contribution using the decryption module in the playback device comprises generating the decryption key using the key base and the at least one key contribution in a key ladder.

8. The method of claim 1, wherein generating the decryption key using the key base and the at least one key contribution using the decryption module in the playback device comprises performing an exclusive-OR (XOR) over the key base and the at least one key contribution.

9. The method of claim 8, wherein performing an exclusive-OR (XOR) over the key base and the at least one key contribution computing KB XOR KC=K, where K is the decryption key, KC is the key contribution, and KB is the key base.

10. The method of claim 1 wherein the control module is a watermark controller module and the control feature is inserting a watermark into video content.

11. The method of claim 1 wherein the control feature regulates what format the content is permitted to be output by the playback device.

12. The method of claim 1 wherein sending the key base and the at least one key contribution to a playback device using the rights management server comprises sending the key base and the at least one key contribution within one or more entitlement control messages (ECM).

13. The method of claim 1 wherein the key contribution is specific to the receiving playback device.

14. The method of claim 1 wherein the control module executes within a trusted environment.

15. The method of claim 12 wherein the trusted environment is a hardware security module.

16. The method of claim 11, wherein receiving the key base at a client application in the playback device and sending the key base to a decryption module in the playback device are not performed within the trusted environment.

17. A system for securing communications in a playback device using a key base and at least one key contribution from a rights management server, the system comprising:
 a rights management server comprising:
  a first processor; and
  memory comprising a key generation application; and
 a playback device comprising:
  a second processor; and
  memory comprising a client application, a control application, and a decryption application;
 wherein the rights management server is configured by the key generation application to:
  generate a key base using a decryption key and at least one key contribution, where the decryption key can be recovered using the key base and the at least one key contribution and the decryption key is necessary to access a piece of content;
  send the key base and the at least one key contribution to a playback device; and
 wherein the playback device is configured by the client application to:
  receive the key base;
  receive the at least one key contribution; and
  send the key base to a decryption application within the playback device; and
  send the key contribution to a control application within the playback device;
 wherein the playback device is configured by the control application to:
  perform a control feature on aspects of playback of the piece of content to enforce control mechanisms on playback of the piece content when the control application has the key contribution; and
  provide the key contribution from the control application to the decryption application when the control feature is performed by the control application; and
 wherein the playback device is configured by the decryption application to:
  generate the decryption key using the key base and the at least one key contribution; and
  access at least a portion of the piece of content using at least the generated decryption key.

* * * * *